United States Patent
Zu

(10) Patent No.: US 12,223,693 B2
(45) Date of Patent: Feb. 11, 2025

(54) OBJECT DETECTION METHOD, OBJECT DETECTION APPARATUS, AND OBJECT DETECTION SYSTEM

(71) Applicant: BOE TECHNOLOGY GROUP CO., LTD., Beijing (CN)

(72) Inventor: Chunshan Zu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/772,923

(22) PCT Filed: Apr. 1, 2021

(86) PCT No.: PCT/CN2021/084995
§ 371 (c)(1),
(2) Date: Apr. 28, 2022

(87) PCT Pub. No.: WO2022/205329
PCT Pub. Date: Oct. 6, 2022

(65) Prior Publication Data
US 2024/0161461 A1    May 16, 2024

(51) Int. Cl.
*G06K 9/00* (2022.01)
*G06T 7/73* (2017.01)
(Continued)

(52) U.S. Cl.
CPC .............. *G06V 10/774* (2022.01); *G06T 7/73* (2017.01); *G06V 10/7715* (2022.01);
(Continued)

(58) Field of Classification Search
CPC .............. G06V 10/774; G06V 10/7715; G06V 10/806; G06V 10/82; G06V 2201/07;
(Continued)

(56) References Cited

U.S. PATENT DOCUMENTS 10,528,819 B1    1/2020  Manmatha et al.
2018/0259970 A1  9/2018  Wang et al.
(Continued)

FOREIGN PATENT DOCUMENTS

CN    109977812 A    7/2019
CN    111369617 A    7/2020
(Continued)

OTHER PUBLICATIONS

Tang, Yi, et al. "Weakly supervised salient object detection with spatiotemporal cascade neural networks." IEEE Transactions on Circuits and Systems for Video Technology 29.7 (2018): 1973-1984 (Year: 2018).*

(Continued)

*Primary Examiner* — Andrew M Moyer
(74) *Attorney, Agent, or Firm* — IP & T GROUP LLP

(57) ABSTRACT

An object detection method includes: obtaining a video to be detected; preprocessing the video to be detected to obtain an image to be detected; inputting the image to be detected into an object detection network; extracting, by the object detection network, a feature map of the image to be detected; performing, by the object detection network, an object prediction on the extracted feature map to obtain a position of an object in the image to be detected and a confidence degree corresponding to the position; and generating a marked object video according to the position of the object in the image to be detected, the confidence degree corresponding to the position, and the video to be detected.

17 Claims, 9 Drawing Sheets

(51) Int. Cl.
  *G06V 10/77* (2022.01)
  *G06V 10/774* (2022.01)
  *G06V 10/80* (2022.01)
  *G06V 10/82* (2022.01)
(52) U.S. Cl.
  CPC ............ G06V 10/806 (2022.01); G06V 10/82 (2022.01); *G06T 2207/10016* (2013.01); *G06T 2207/20081* (2013.01); *G06T 2207/20084* (2013.01); *G06V 2201/07* (2022.01)
(58) Field of Classification Search
  CPC ................... G06V 10/454; G06T 7/73; G06T 2207/10016; G06T 2207/20081; G06T 2207/20084; G06T 7/00; G06T 7/70; G06N 3/04
  See application file for complete search history.

(56) References Cited

U.S. PATENT DOCUMENTS

2019/0156144 A1   5/2019   Li et al.
2021/0374421 A1*  12/2021  Chakraborty .......... G06V 10/75

FOREIGN PATENT DOCUMENTS

CN         112200187 A     1/2021
WO     2019/161300 A1    8/2019

OTHER PUBLICATIONS

Zhang, Shifeng, et al. "Single-Shot Refinement Neural Network for Object Detection." 2018 IEEE/CVF Conference on Computer Vision and Pattern Recognition. IEEE, 2018 (Year: 2018).*

* cited by examiner

OBJECT DETECTION METHOD, OBJECT DETECTION APPARATUS, AND OBJECT DETECTION SYSTEM

CROSS-REFERENCE TO RELATED APPLICATION

This application is a national phase entry under 35 USC 371 of International Patent Application No. PCT/CN2021/084995, filed on Apr. 1, 2021, which is incorporated herein by reference in its entirety.

TECHNICAL FIELD

The present disclosure relates to the field of intelligent recognition technologies, and in particular, to an object detection method, an object detection apparatus, and an object detection system.

BACKGROUND

Object detection is an important research direction in the field of computer vision, and objects (e.g., people, animals or other specified objects) contained in images is determined by detecting the objects in the images captured by cameras. The object detection is widely applied in the fields of vehicle assisted driving, intelligent monitoring, intelligent robots, etc.

In a process of the object detection, an object detection network may be trained by using sample images and marked objects in the sample images, and then the trained object detection network is used to detect the objects in the images.

SUMMARY

In an aspect, an object detection method is provided. The method includes: obtaining a video to be detected; preprocessing the video to be detected to obtain an image to be detected; inputting the image to be detected into an object detection network; extracting, by the object detection network, a feature map from the image to be detected, performing, by the object detection network, an object prediction on the extracted feature map to obtain a position of an object in the image to be detected and a confidence degree corresponding to the position; and generating a marked object video according to the position of the object in the image to be detected, the confidence degree corresponding to the position, and the video to be detected. The object detection network includes multi-layer cascade networks, a feature map extracted by a cascade network in each layer is obtained according to a first feature map and a second feature map, the first feature map is obtained by performing a convolution on a feature map extracted by a previous-layer cascade network, and the second feature map is obtained by performing a linear transformation on the first feature map.

In some embodiments, the object detection network includes a feature extraction network, a feature fusion network and a prediction network. The feature extraction network includes the multi-layer cascade networks.

Inputting the image to be detected into the object detection network, extracting, by the object detection network, the feature map from the image to be detected, and performing, by the object detection network, the object prediction on the extracted feature map to obtain the position of the object in the image to be detected and the confidence degree corresponding to the position, includes: inputting the image to be detected into the feature extraction network, and performing, by the cascade network in each layer, the convolution on the feature map extracted by a previous-layer cascade network to obtain the first feature map, performing, by the cascade network in each layer, the linear transformation on the first feature map to obtain the second feature map, and obtaining, by the cascade network in each layer, the feature map extracted by the cascade network in each layer according to the first feature map and the second feature map; inputting a plurality of feature maps extracted by the multi-layer cascade networks into the feature fusion network to fuse the feature maps, so as to obtain a fused feature map; and inputting the fused feature map into the prediction network for object prediction, so as to obtain the position of the object in the image to be detected and the confidence degree corresponding to the position.

In some embodiments, the cascade network in each layer includes a feature map extraction network and a weight learning network. Performing, by the cascade network in each layer, the convolution on the feature map extracted by the previous-layer cascade network to obtain the first feature map, performing, by the cascade network in each layer, the linear transformation on the first feature map to obtain the second feature map, and obtaining, by the cascade network in each layer, the feature map extracted by the cascade network in each layer according to the first feature map and the second feature map, includes: performing, by the feature map extraction network, a convolution on the feature map extracted by the previous-layer cascade network to obtain the first feature map; performing, by the feature map extraction network, a linear transformation on the first feature map to obtain the second feature map; combining, by the feature map extraction network, the first feature map and the second feature map to generate a combined feature map; and learning, by the weight learning network, weight of each channel feature in the combined feature map to obtain the feature map extracted by the cascade network in each layer.

In some embodiments, the feature map extraction network includes at least one group of neural network modules; each neural network module is used to perform a convolution, a linear transformation and a combination on an input content of the neural network module to generate a combined feature map corresponding to the neural network module. The method further includes: obtaining sample images and positions of objects in the sample images; preprocessing the sample images to obtain sample images to be detected; training an initial object detection network by using the sample images to be detected and the positions of the objects in the sample images, and determining a number of groups of neural network modules included in the feature map extraction network in the cascade network each layer; and generating the object detection network according to the determined number of groups of neural network modules.

In some embodiments, the feature extraction network includes three-layer cascade networks, and the three-layer cascade networks include a first-layer cascade network, a second-layer cascade network, and a third-layer cascade network. A feature map extraction network in the first-layer cascade network includes one group of neural network modules. A feature map extraction network in the second-layer cascade network includes nine groups of neural network modules. A feature map extraction network in the third-layer cascade network includes nine groups of neural network modules.

In some embodiments, the feature map extraction network further includes a network layer including a depthwise separable convolution and at least one neural network module.

In some embodiments, output(s) of the at least one group of neural network modules in the feature map extraction network are connected to an input of the network layer. The network layer includes a first neural network module, the depthwise separable convolution, a second neural network module, and a summation operation. The input of the network layer is an input of the first neural network module, an output of the first neural network module is connected to an input of the depthwise separable convolution, an output of the depthwise separable convolution is connected to an input of the second neural network module, an output of the second neural network module and the input of the network layer are connected to an input of the summation operation, and an output of the summation operation is an output of the network layer.

In some embodiments, the object detection network obtains positions of objects in the image to be detected and confidence degrees corresponding to the positions; and generating the marked object video according to the position of the object in the image to be detected, the confidence degree corresponding to the position, and the video to be detected, includes: performing a coordinate transformation on a target position in the positions of the objects in the image to be detected according to the confidence degrees corresponding to the positions and an image size corresponding to the video to be detected, so as to obtain a transformed position corresponding to the image to be detected; and marking an object in an original image corresponding to the image to be detected in the video to be detected according to the transformed position corresponding to the image to be detected, so as to generate the marked object video.

A confidence degree corresponding to the target position is greater than confidences corresponding to other positions, and the other positions are positions other than the target position in the positions of the objects in the image to be detected. The transformed position corresponding to the image to be detected represents a position of a detection frame of the object in the image to be detected in the original image corresponding to the image to be detected in the video to be detected.

In some embodiments, the image to be detected includes an i-th frame of image, a j-th frame of image, a g-th frame of image, and an h-th frame of image; i, j, g, and h are all positive integers; and i is greater than j, j is greater than g, and g is greater than h. While preprocessing the video to be detected to obtain the i-th frame of image, the object detection network extracts a feature map from the j-th frame of image, performs an object prediction on the extracted feature map, performs a coordinate transformation on a target position of positions of objects in the g-th frame of image, and marks an object in an original image corresponding to the h-th frame of image in the video to be detected.

In yet another aspect, an object detection apparatus is provided. The apparatus includes a memory and a processor. The memory is coupled to the processor. The memory is used to stores computer program codes, and the computer program codes include computer instructions. When executed by the processor, the computer instructions cause the apparatus to perform the object detection method as described in any of the above embodiments.

In yet another aspect, an object detection system is provided. The object detection system includes the object detection apparatus described in the above embodiments, and multimedia acquisition device(s). The object detection apparatus is connected to the multimedia acquisition device(s). The multimedia acquisition device(s) are used to acquire the video to be detected.

In yet another aspect, a non-transitory computer-readable storage medium is provided. The computer-readable storage medium stores computer programs therein. When run on an object detection apparatus, the computer programs cause the object detection apparatus to perform the object detection method according to any of the above embodiments.

In some embodiments, the video to be detected includes video streams; and preprocessing the video to be detected to obtain the image to be detected, includes: preprocessing each video stream in the video to be detected to obtain a plurality of frames of images, so as to obtain the image to be detected. The plurality of frames of images constitute an image to be detected corresponding to the video stream, and the image to be detected corresponding to the video to be detected includes the plurality of frames of images in the image to be detected corresponding to the video stream.

In some embodiments, extracting, by the object detection network, the feature map from the image to be detected, and performing, by the object detection network, the object prediction on the extracted feature map to obtain the position of the object in the image to be detected and the confidence degree corresponding to the position, includes: extracting, by the object detection network, feature maps from the plurality of frames of images in the image to be detected corresponding to the video stream; and performing, by the object detection network, the object prediction on the extracted feature maps to obtain positions of objects in the plurality of frames of images in the image to be detected corresponding to the video stream and confidence degrees corresponding to the positions.

In some embodiments, generating the marked object video according to the position of the object in the image to be detected, the confidence degree corresponding to the position, and the video to be detected, includes: generating a marked object video corresponding to the video stream according to the positions of the objects in the plurality of frames of images in the image to be detected corresponding to the video stream, the confidence degrees corresponding to the positions, and the video stream, so as to obtain marked object videos corresponding to the video streams in the video to be detected.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these accompanying drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
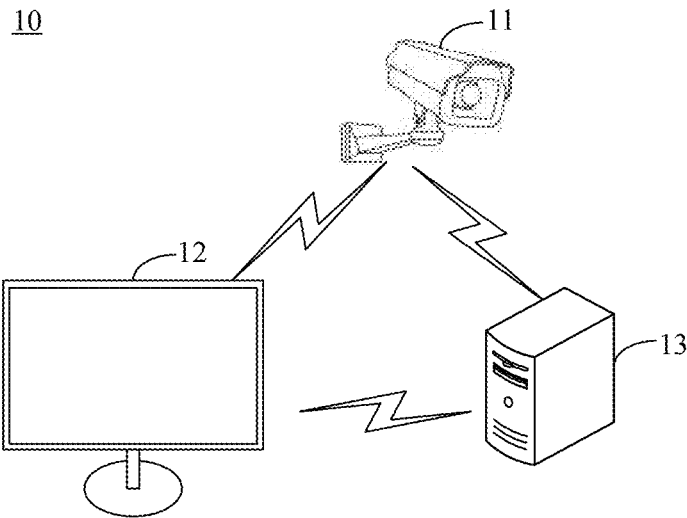
FIG. 1 is a diagram showing a structure of an object detection system, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description of the specification, the terms "one embodiment", "some embodiments", "exemplary embodiments", "an example" or "some examples" and the like are intended to indicate that specific features, structures, materials, or characteristics related to the embodiment or example are included in at least one embodiment or example of the present disclosure. Schematic representation of the above term does not necessarily refer to the same embodiment(s) or examples(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "multiple", "a plurality of" or "the plurality of" means two or more unless otherwise specified.

In the description of some embodiments, terms such as "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "A and/or B" includes the following three combinations: only A, only B, and a combination of A and B.

As used herein, the term "if" is optionally construed as "when" or "in a case where" or "in response to determining" or "in response to detecting", depending on the context. Similarly, the phrase "if it is determined that" or "if [a stated condition or event] is detected" is optionally construed as "in a case where it is determined that", "in response to determining that", "in a case where [the stated condition or event] is detected", or "in response to detecting [the stated condition or event]", depending on the context.

In addition, the use of the phrase "based on" or "according to" indicates openness and inclusiveness, since a process, step, calculation or other action that is "based on" or "according to" one or more of the stated conditions or values may be based on additional conditions or values exceeding those stated in practice.

An object detection technology has been used in more and more fields such as vehicle assisted driving, intelligent monitoring, and intelligent robots. In some examples, a sample image is obtained, and an object in the sample image is marked. Then, the marked sample image is used to train a neural network to obtain an object detection network. At present, an accuracy of the object detection network may basically meet certain requirements. However, the object detection network obtained by training the neural network needs to process a large amount of parameters in an object detection process, resulting in a low object detection efficiency.

Embodiments of the present disclosure provide an object detection method. The object detection method can reduce an amount of parameters processed in an object detection process, thereby improving object detection efficiency.

The object detection method provided in the embodiments of the present disclosure can be applied to an object detection system. FIG. 1 is a diagram showing a structure of the object detection system in accordance with some embodiments. The object detection system 10 provided in the embodiments of the present disclosure includes a plurality of multimedia acquisition devices 11, a terminal 12, and a server 13. The plurality of multimedia acquisition devices 11 are connected to the terminal 12, and the plurality of multimedia acquisition devices 11 may further be connected to the server 13. The terminal 12 may be connected to the server 13.

The multimedia acquisition device 11 is a device for acquiring images or videos, such as a camera. The terminal 12 may be an electronic device including a display module, such as a mobile phone, a personal computer, a notebook computer, a virtual reality terminal, an augmented reality terminal, or a wireless terminal in unmanned driving. For example, as shown in FIG. 1, the terminal 12 is a notebook computer.

An object may be a person, an animal or other specified objects. For example, the object in the object detection system used in intelligent monitoring may be a person.

In practical applications, the server 13 may be integrated in the terminal 12, or the server 13 and the terminal 12 may be arranged separately. Unless otherwise specified, the following contents in the embodiments of the present disclosure are described by taking an example where the server 13 and the terminal 12 are independent devices.

A principle of the object detection method provided in the embodiments of the present disclosure will be described below.

Figure 2:
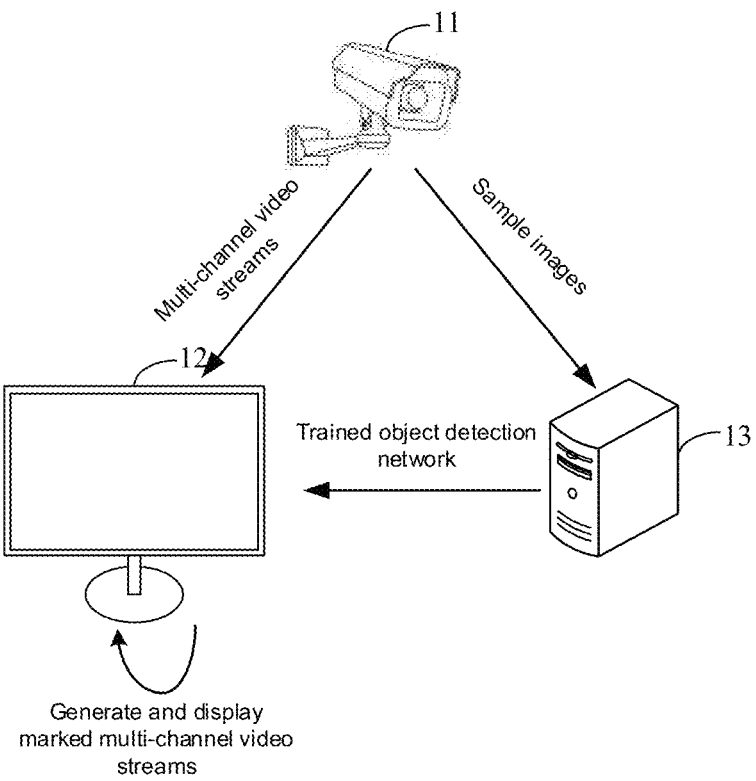
FIG. 2 is a diagram showing a process of an object detection method performed by an object detection system, in accordance with some embodiments.

As shown in FIG. 2, in a possible implementation manner, the plurality of multimedia acquisition devices 11 acquire multi-channel video streams in real time, and send the multi-channel video streams to the terminal 12. The terminal 12 detects objects in the multi-channel video streams by using a pre-stored object detection network after receiving the multi-channel video streams, marks the objects in the multi-channel video streams, generates multi-channel marked video streams, and displays the multi-channel marked video streams. The server 13 may further update the object detection network according to a preset training period or other update conditions, and send the updated object detection network to the terminal 12. The terminal 12 detects objects in video streams received subsequently by using the updated detection network.

In some embodiments, the multimedia acquisition devices 11 or other multimedia acquisition devices acquire sample images before the terminal 12 detects the objects in the multi-channel video streams by using the object detection network. Then, the terminal 12 determines detection frames of objects in the sample images in response to marking operation of a user on the objects in the sample images. The detection frames of the objects in the sample images may be marked by the user through the marking operation. Then, the terminal 12 may send the sample images and the detection frames of the objects in the sample images to the server 13. The server 13 may train a neural network to obtain the object detection network by using the sample images and the detection frames of the objects in the sample images, and send the object detection network to the terminal 12. The terminal 12 stores the object detection network. The other multimedia acquisition devices are different from the multimedia acquisition devices 11.

Figure 3:
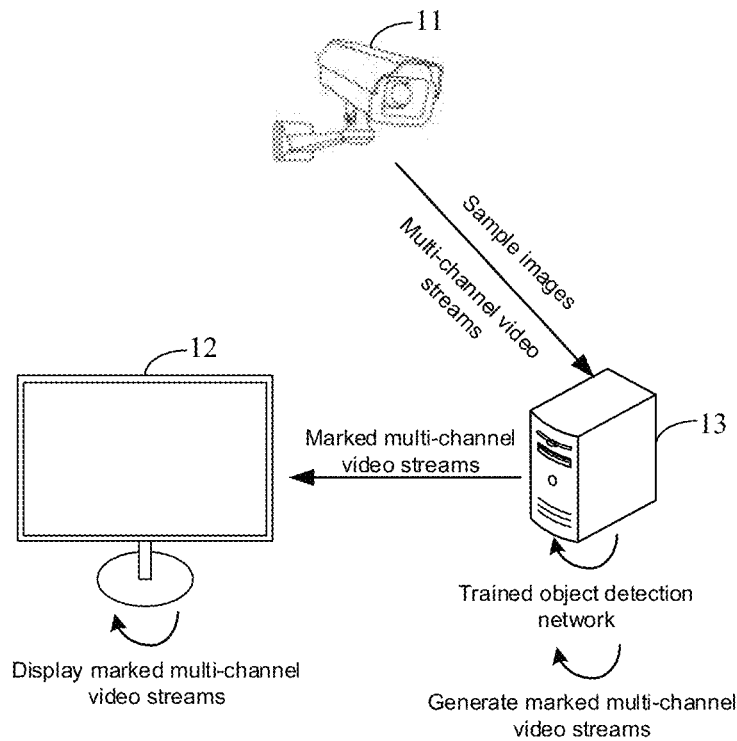
FIG. 3 is a diagram showing a process of another object detection method performed by an object detection system, in accordance with some embodiments.

As shown in FIG. 3, in another possible implementation manner, the plurality of multimedia acquisition devices 11 acquire multi-channel video streams in real time, and send the multi-channel video streams to the server 13. The server 13 detects objects in the multi-channel video streams by using a pre-stored object detection network after receiving the multi-channel video streams, marks the objects in the multi-channel video streams, and generates the marked multi-channel video streams. The server 13 sends the marked multi-channel video streams to the terminal 12. The terminal 12 displays the marked multi-channel video streams. The server 13 may further update the object detection network according to a preset training period or other update conditions, and detect objects in video streams received subsequently by using the updated detection network.

It will be noted that, for a specific process of obtaining the object detection network by the server 13 before using the object detection network to detect the objects in the multi-channel video streams, reference can be made to the above detailed description of the server 13 training the neural network to obtain the object detection network, which will not be repeated here.

An execution subject of the object detection method provided in the embodiments of the present disclosure is an object detection apparatus. The object detection apparatus may be the terminal 12 in the object detection system 10, or may be the server 13 in the object detection system 10. In a case where the server 13 is integrated in the terminal 12, the object detection apparatus may be the terminal 12 integrated with the server 13.

It will be noted that the number of devices (e.g., multimedia acquisition devices, terminals, or servers) in any of FIGS. 1 to 3 is merely illustrative, and the embodiments of the present disclosure do not limit the number of the devices in the object detection system.

In the embodiments of the present disclosure, in order to reduce the amount of parameters processed in the object detection process, the object detection network extracts a feature map by using a convolution and a linear transformation instead of using a convolution; and an amount of parameters processed in a process of extracting the feature map by using the convolution and the linear transformation is less than an amount of parameters processed in a process of extracting the feature map by using the convolution. In this way, the amount of parameters processed in the object detection process is reduced, and object detection efficiency is improved.

Figure 4:
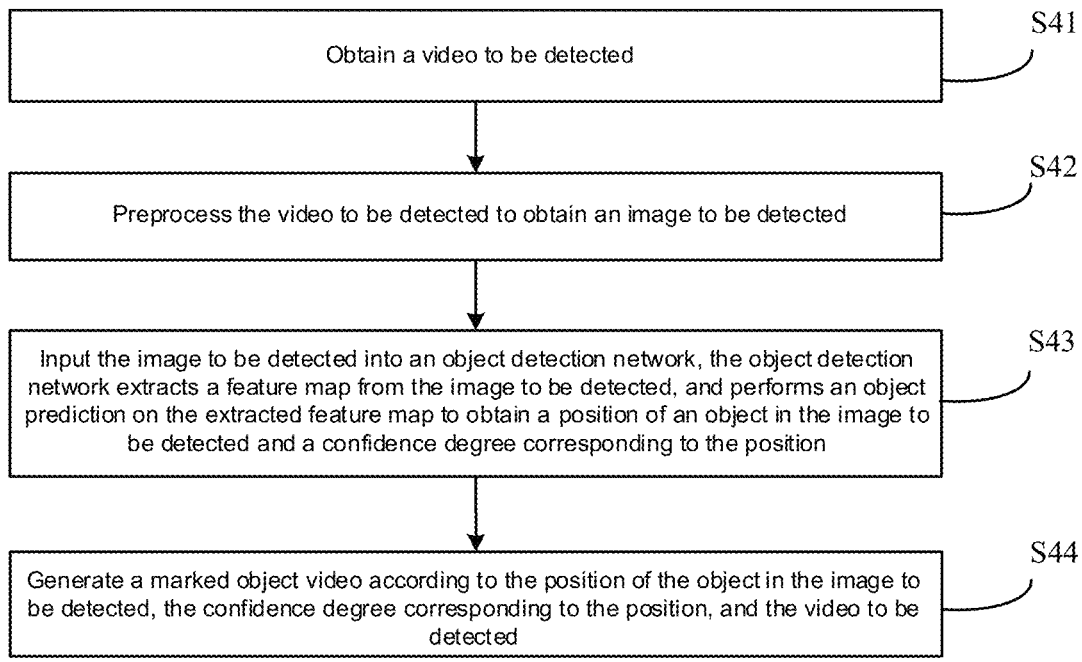
FIG. 4 is a flow diagram of an object detection method, in accordance with some embodiments.

As shown in FIG. 4, the object detection method provided in the embodiments of the present disclosure includes steps 41 to 44 (S41 to S44).

In S41, a video to be detected is obtained.

The video to be detected may include one or more video streams.

For example, the object detection apparatus may receive the multi-channel video streams from the plurality of multimedia acquisition devices. The video to be detected includes the multi-channel video streams. The object detection apparatus may perform the object detection method on each video stream in the video to be detected.

In S42, the video to be detected is preprocessed to obtain an image to be detected.

The preprocessing may include a video decoding processing, a size normalization processing, etc. The image to be detected may include one or more frames of images.

In some embodiments, the object detection apparatus may perform a video decoding processing on each video stream in the video to be detected, so as to obtain a plurality of frames of original images. Then, the object detection apparatus performs a size normalization processing on the plurality of frames of original images, so as to obtain a plurality of frames of images. The plurality of frames of images constitute an image to be detected corresponding to the video stream. A size of each frame of image is equal to a preset size (e.g., 384×384).

The plurality of frames of original images obtained through the video decoding processing may be a plurality of frames of red, green, and blue (RGB) images. That is to say, the video decoding processing may refer to converting the video stream into the plurality of frames of RGB images. Each pixel point in each frame of RGB image may have color information of three channels, the three channels are a red channel, a green channel, and a blue channel, and values of the color information of the red, green and blue channels of each pixel point are different. For example, in a case where values of color information of red, green and blue channels corresponding to a pixel point are 0, the pixel point is white; and in a case where values of color information of red, green and blue channels corresponding to a pixel point are 255, the pixel point is black.

The size normalization processing may include: a reduction processing; or a reduction processing and a padding processing.

For example, in a case where the preset size is less than a size of each frame of original image, the object detection apparatus may reduce the size of each frame of original image according to the preset size to obtain a reduced image. In a case where a width of the reduced image is equal to a width of the preset size, and a height of the reduced image is equal to a height of the preset size, the object detection apparatus determines that the reduced image is a frame of image in the image to be detected. In a case where the width of the reduced image is equal to the width of the preset size and the height of the reduced image is less than the height of the preset size, or the width of the reduced image is less than the width of the preset size and the height of the reduced image is equal to the height of the preset size, the reduced image is padded to obtain a frame of image with a size equal to the preset size.

In S43, the image to be detected is input into the object detection network, the object detection network extracts a feature map from the image to be detected, and performs object prediction on the extracted feature map to obtain a position of an object in the image to be detected and a confidence degree corresponding to the position.

The object detection network includes multi-layer cascade networks, a feature map extracted by a cascade network in each layer is obtained according to a first feature map and a second feature map, the first feature map is obtained by performing a convolution on a feature map extracted by a previous-layer cascade network, and the second feature map is obtained by performing a linear transformation on the first feature map. The multi-layer cascade networks are connected in series.

For example, the feature map extracted by the cascade network in each layer may be obtained by learning weight of each channel feature in a combined feature map composed of the first feature map and the second feature map, and using the weight of each channel feature in the combined feature map to mark weight of a corresponding feature map in the combined feature map. Each feature map in the combined feature map is a channel feature, and weight of the channel feature represents importance of the channel feature.

In some embodiments, the object detection apparatus may input the image to be detected corresponding to each video stream into the object detection network; and the object detection network extracts a feature map from each frame of image in the image to be detected, performs object prediction on the extracted feature map, and outputs a position of an object in the frame of image and a confidence degree corresponding to the position.

The position of the object in each frame of image in the image to be detected may be a position of one object or positions of more objects. Positions of objects in each frame of image are in one-to-one correspondence with confidence degrees corresponding to the positions. A confidence degree corresponding to a position of any object represents a credibility of the position of the object.

The position of the object may be coordinates of a detection frame of the object in an image to which the object belongs. The detection frame is used to indicate a region of the object in the image to which the object belongs. The detection frame may be a box.

The object detection network may simultaneously process the plurality of frames of images in the image to be detected by using a batch processing. For example, the object detection network extracts feature maps from the plurality of frames of images, and performs object prediction on the extracted feature maps, and outputs positions of objects in the plurality of frames of images and confidence degrees corresponding to the positions.

It can be understood that, the object detection network may simultaneously process the plurality of frames of images in the images to be detected by using the batch processing, which may reduce working time of the object detection network compared with a case in which one frame of image in the image to be detected is processed each time.

In some embodiments, the linear transformation may be affine transformation, rotation, translation, etc.

In some embodiments, the object detection network may include a feature extraction network, a feature fusion network, and a prediction network. The feature extraction network includes the multi-layer cascade networks. An input of the object detection network is an input of the feature extraction network, an output of the feature extraction network is connected to an input of the feature fusion network, and an output of the feature fusion network is connected to an input of the prediction network.

The feature extraction network is used to extract semantic feature information (e.g., a feature map) related to the object in the image to be detected. The feature extraction network may adopt a bottom-up and stepwise refinement feature extraction architecture, such as a backbone network in You Only Look Once (YOLO), or a convolutional neural network (CNN) for image classification such as a visual geometry group (VGG) or a residual network (ResNet).

The feature fusion network is used to fuse multi-layer semantic feature information extracted by the feature extraction network to obtain a feature that includes both high-layer semantic feature information and low-layer semantic feature information. The feature fusion network may be a structure composed of up-sampling and fusion splicing, such as a neck network Neck in YOLO or a private network of YOLO series; and the neck network Neck may be a network such as a feature pyramid network (FPN) or a personal area network (PAN).

The prediction network is used to extract a position of an object from a feature map output by the feature fusion network and a confidence degree corresponding to the position. For example, the prediction network may be a head network Head in YOLO.

The object detection apparatus may input the image to be detected into the feature extraction network, and the cascade network in each layer in the feature extraction network performs a convolution on the feature map extracted by the previous-layer cascade network to obtain the first feature map, and performs a linear transformation on the first feature map to obtain the second feature map, and thus the feature map extracted by the cascade network in each layer is obtained according to the first feature map and the second feature map. Then, the object detection apparatus inputs a plurality of feature maps extracted by the multi-layer cascade network into the feature fusion network to fuse the feature maps, so as to obtain fused feature maps. The object detection apparatus inputs the fused feature maps into the prediction network for object prediction, so as to obtain position(s) of object(s) in the image to be detected and confidence degree(s) corresponding to the position(s).

Since a first-layer cascade network in the feature extraction network does not have a previous-layer cascade network, the first-layer cascade network in the feature extraction network performs a convolution on the image to be detected to obtain a first feature map. That is to say, a feature map extracted by the previous-layer cascade network corresponding to the first-layer cascade network is the image to be detected.

In some embodiments, the object detection apparatus may further perform, on the object detection network, any one of the following operations: an operator fusion, a model pruning, or a model quantization. In this way, a detection speed of the object detection network is improved.

In S44, a marked object video is generated according to the position of the object in the image to be detected, the confidence degree corresponding to the position, and the video to be detected.

For each video stream in the video to be detected, the object detection apparatus may mark an object in an original image corresponding to the image to be detected in the video stream according to the position of the object in the image to be detected corresponding to the video stream and the confidence degree corresponding to the position, so as to generate a marked object video corresponding to the video stream. Furthermore, the object detection apparatus may obtain a plurality of marked object videos corresponding to the multi-channel video streams in the video to be detected. The object detection apparatus may simultaneously display the plurality of marked object videos corresponding to the multi-channel video streams.

In some embodiments, the object detection apparatus may perform a coordinate transformation on target position(s) in positions of objects in the image to be detected according to confidence degrees corresponding to the positions and an image size corresponding to the video to be detected, so as to obtain transformed position(s) corresponding to the image to be detected. Then, the object detection apparatus marks an object in an original image corresponding to the image to be detected in the video to be detected according to a transformed position corresponding to the image to be detected, so as to generate the marked object video.

A confidence degree corresponding to the target position is greater than confidence degrees corresponding to other positions, and the other positions are positions other than the target position in the positions of the objects in the image to be detected. The transformed position corresponding to the image to be detected represents a position of a detection frame of an object in the image to be detected in an original image corresponding to the image to be detected in the video to be detected.

In some embodiments, the position of the object is coordinates of a detection frame of the object in an image to which the object belongs, and a transformed position of the object is coordinates of a transformed detection frame. The object detection apparatus performs a first operation on each frame of image in the image to be detected, so as to obtain coordinates of a transformed detection frame corresponding to the frame of image. The first operation includes: determining coordinates of a target detection frame with a large confidence degree from coordinates of detection frames of objects in the frame of image according to confidence degrees corresponding to the coordinates of the detection frames of the object in the frame of image; and transforming the coordinates of the target detection frame to coordinates matching the image size corresponding to the video to be detected, that is, the coordinates of the transformed detection frame.

The object detection apparatus may divide coordinates of detection frames of objects in each frame of image into detection frame groups, and determines coordinates of a target detection frame with a large confidence degree in each detection frame group. A distance between different detection frame groups is large, and distances between detection frames in the same detection frame group are small.

For example, the object detection apparatus may adopt a non-maximum suppression (NMS) method; and according to the confidence degrees corresponding to the coordinates of the detection frames of the objects in each frame of image, the object detection apparatus determines the coordinates of the target detection frame with the large confidence degree from the coordinates of the detection frames of the objects in the frame of image.

Each frame of image in the image to be detected is obtained by performing a size normalization processing on a corresponding frame of original image in the video to be detected. In this case, the object detection apparatus may perform an operation opposite to the size normalization processing on the frame of image to obtain a restored image, and determine that coordinates of a target detection frame in the frame of image in the restored image is coordinates of a transformed detection frame.

For example, the size normalization processing includes a reduction processing. In this case, the object detection apparatus enlarges each frame of image in the image to be detected to obtain the restored image, and the restored image and the corresponding frame of original image in the video to be detected have a same size.

For example, the size normalization processing includes a reduction processing and a padding processing. In this case, the object detection apparatus removes a padding part of each frame of image in the image to be detected, and then enlarges the removed image to obtain the restored image. The restored image and the corresponding frame of original image in the video to be detected have a same size.

In some embodiments, the object detection apparatus marks an object in an original image corresponding to the image to be detected in the video to be detected according to the transformed position corresponding to the image to be detected, so as to generate a marked object video.

Each video stream includes a plurality of frames of original images, the image to be detected corresponding to each video stream includes a plurality of frames of images, and the plurality of frames of original images are in one-to-one correspondence with the plurality of frames of images. The object detection apparatus may mark an object in an original image corresponding to the video stream according to a transformed position corresponding to each frame of image in the image to be detected corresponding to each video stream, and compose a marked object video from all marked original images in the video stream. Therefore, the object detection apparatus may obtain a plurality of marked object videos corresponding to the multi-channel video streams.

In addition, the object detection apparatus may simultaneously display the plurality of marked object videos corresponding to the multi-channel video streams.

The object detection apparatus may display the plurality of marked object videos on the same display interface after arranging the plurality of marked object videos, according to information such as the number of video streams included in the video to be detected, a resolution of the video to be detected, a resolution of the display module, and a size of a display region.

For example, the object detection apparatus may scale the plurality of marked object videos according to the number of video streams included in the video to be detected and the size of the display region, so that the scaled videos may be displayed on the same display interface. The object detection apparatus may further display the scaled videos on the same display interface after the scaled videos are fused with a background image of the display interface.

Figure 5:
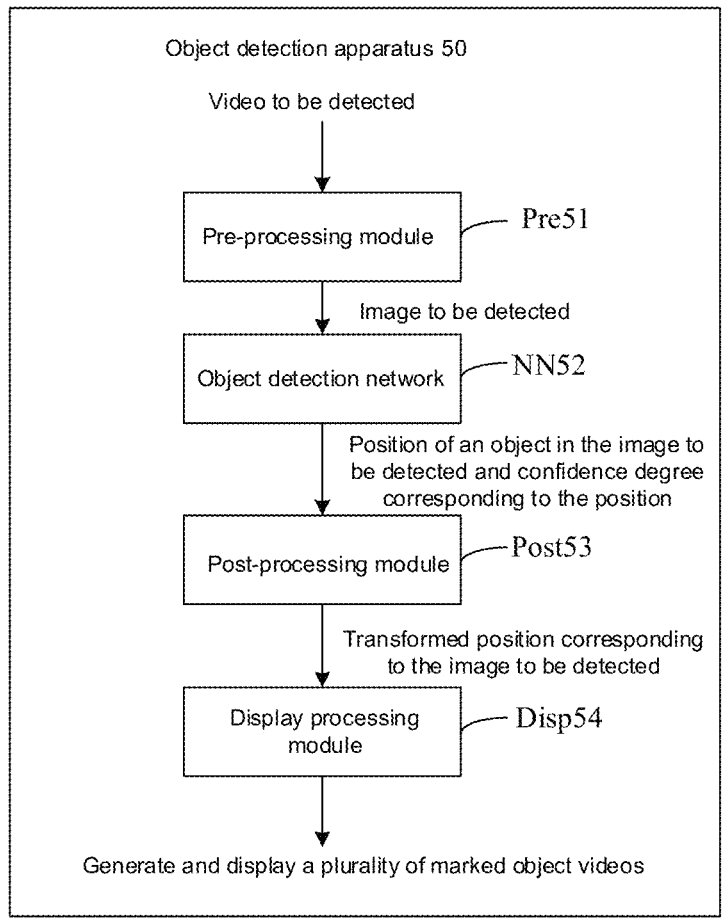
FIG. 5 is a diagram showing a structure of an object detection apparatus, in accordance with some embodiments.

For example, as shown in FIG. 5, the object detection apparatus 50 may include a pre-processing module Pre51, an object detection network NN52, a post-processing module Post53 and a display processing module Disp54. The video to be detected obtained by the object detection apparatus 50 is input to the pre-processing module Pre51.

The pre-processing module Pre51 performs S42 to obtain the image to be detected. The object detection network NN52 performs S43 to obtain position(s) of object(s) in the image to be detected and confidence degree(s) corresponding to position(s). The post-processing module Post53 performs a coordinate transformation on target position(s) in the position(s) of the object(s) in the image to be detected according to the confidence degree(s) corresponding to the position(s) and the image size corresponding to the video to be detected, so as to obtain transformed position(s) corresponding to the image to be detected. The display processing module Disp54 marks object(s) in original image(s) corresponding to the image to be detected in the video to be detected according to the transformed position(s) corresponding to the image to be detected, so as to generate the marked object video. For example, the display processing module Disp54 displays a plurality of marked object videos on the same display interface according to the information such as the number of video streams included in the video to be detected, the resolution of the video to be detected, the resolution of the display module, and the size of the display region.

Figure 6A:
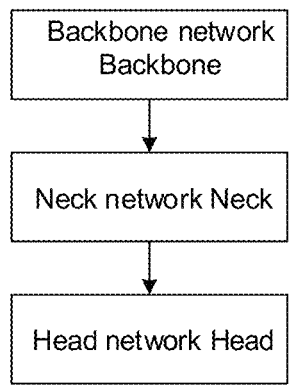
FIG. 6A is a diagram showing a structure of a You Only Look Once (YOLO) network, in accordance with some embodiments.
Figure 6B:
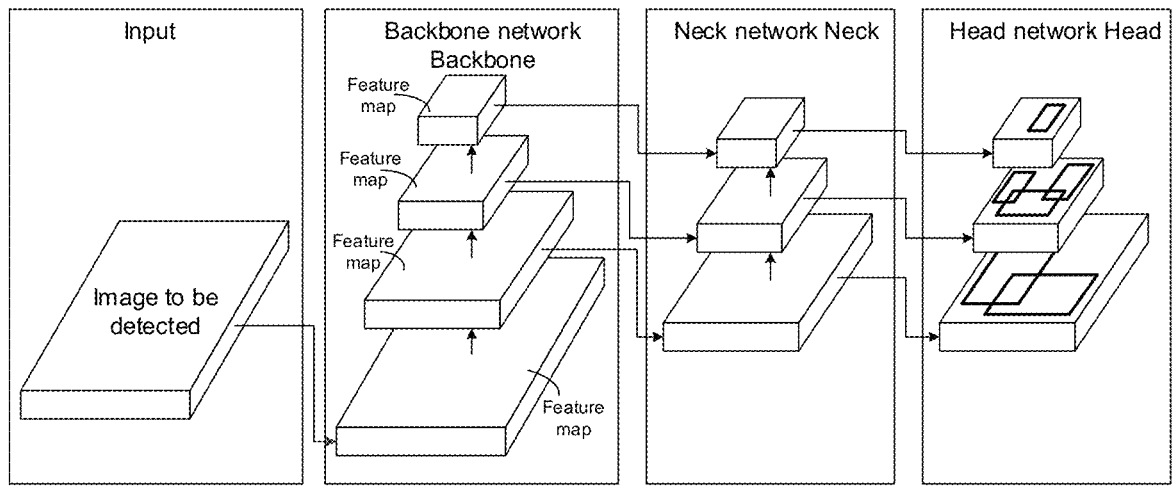
FIG. 6B is a diagram showing a process of an object detection performed by a YOLO network, in accordance with some embodiments.

For example, considering a YOLO network and a position of an object being coordinates of a detection frame in an image to which the object belongs as an example, the object detection network NN52 may be obtained by training an improved YOLO network. As shown in FIG. 6A, a general YOLO network mainly includes a backbone network Backbone, a neck network Neck and a head network Head. As shown in FIG. 6B, the backbone network is used to extract semantic feature information (e.g., a feature map) related to an object in an image to be detected. The backbone network is composed of a multi-layer convolutional neural network, which may extract feature maps from the image to be detected through multi-layer and multi-channel convolution kernels. The neck network is used to fuse multi-layer semantic feature information output by the backbone network to obtain fused feature maps. The head network is used to extract coordinates of detection frames of objects and confidence degrees corresponding to the coordinates of the detection frames from the fused feature maps output by the neck network.

Figure 6C:
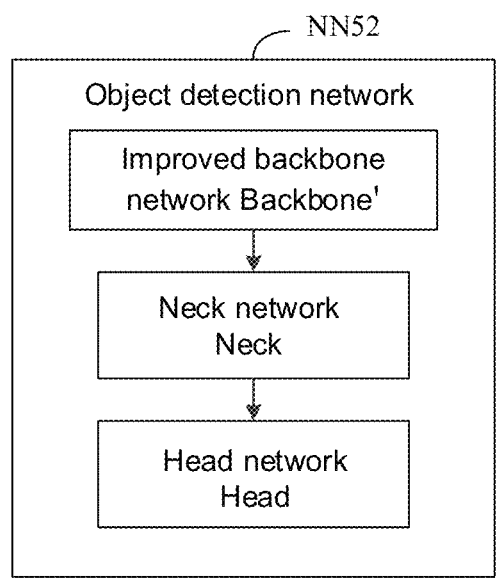
FIG. 6C is a diagram showing a structure of an object detection network, in accordance with some embodiments.

A difference between the improved YOLO network and the general YOLO network is that the improved backbone network in the improved YOLO network adopts a convolution and a linear transformation to extract feature maps, and the backbone network in the general YOLO network adopts a convolution to extract feature maps. The improved YOLO network is trained to obtain the object detection network NN52. As shown in FIG. 6C, a feature extraction network in the object detection network NN52 may be the improved backbone network Backbone', a feature fusion network in the object detection network NN52 is the neck network, and a prediction network in the object detection network NN52 is the head network.

In some embodiments, the cascade network in each layer in the feature extraction network in the object detection network may include a feature map extraction network.

In the object detection apparatus, the feature map extraction network performs the convolution on the feature map extracted by the previous-layer cascade network to obtain the first feature map, performs the linear transformation on the first feature map to obtain the second feature map, and combines the first feature map and the second feature map to generate the combined feature map. The object detection apparatus may determine that the combined feature map corresponding to the cascade network in each layer is the feature map extracted by the cascade network in each layer.

Figure 7A:
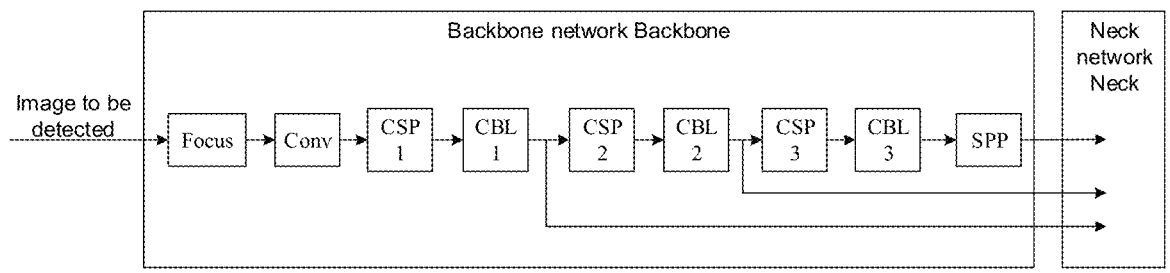
FIG. 7A is a diagram showing a structure of a backbone network and a neck network in a YOLOv5 network, in accordance with some embodiments.

A YOLOv5 network is taken as an example. As shown in FIG. 7A, a backbone network in a general YOLOv5 network may include a focus module Focus, a convolution Cony, a first-layer cross stage partial network CSPNet1, a first-layer standard convolutional layer CBL1, a second-layer cross stage partial network CSPNet2, a second-layer standard convolutional layer CBL2, a third-layer cross stage partial network CSPNet3, a third-layer standard convolutional layer CBL3, and a spatial pyramid pooling (SPP). The focus module Focus is used to perform a slicing operation on an input image to be detected to obtain feature maps that are different from the input image to be detected in size and the number of channels. Any standard convolutional layer CBL may be composed of convolution (Cony), batch normalization (Bn) and leaky rectified linear unit (Leaky_relu). The backbone network in the general YOLOv5 network extracts the feature maps by using the convolution.

Figure 7B:
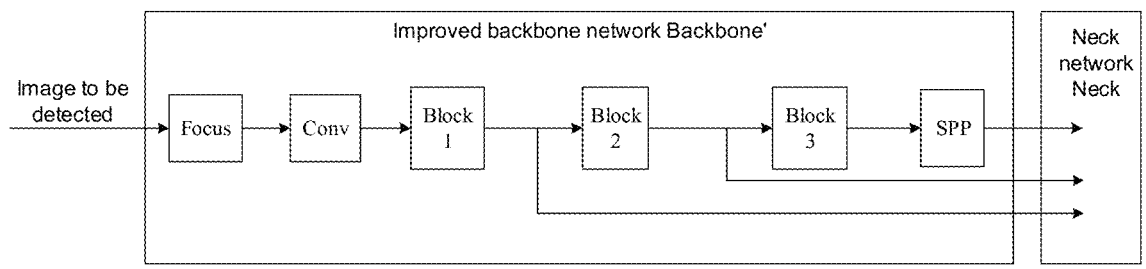
FIG. 7B is a diagram showing a structure of a feature extraction network, in accordance with some embodiments.

The backbone network in the YOLOv5 network shown in FIG. 7A is improved to obtain the feature extraction network in the object detection network NN52. As shown in FIG. 7B, different from the backbone network in the YOLOv5 network, the cascade network in each layer in the feature extraction network may include the feature map extraction network Block. A first-layer cascade network includes a feature map extraction network Block1. The second-layer cascade network includes a feature map extraction network Block2. The third-layer cascade network includes a feature map extraction network Block3.

In some embodiments, the cascade network in each layer in the feature extraction network in the object detection network may include a feature map extraction network and a weight learning network. The object detection apparatus may perform the convolution through the feature map extraction network on the feature map extracted by the previous-layer cascade network to obtain the first feature map, and perform the linear transformation through the feature map extraction network on the first feature map to obtain the second feature map, and combine the first feature map and the second feature map through the feature map extraction network to generate the combined feature map. Then, the object detection apparatus may learn weight of each channel feature in the combined feature map through the weight learning network to obtain the feature map extracted by the cascade network in each layer.

The weight learning network in the cascade network in each layer may be a network layer SE Layer generated by a squeeze-and-excitation network (SENet).

Each feature map in the combined feature map is a channel feature. The object detection apparatus may learn the combined feature map to obtain the weight of each channel feature, and use the weight of each channel feature in the combined feature map to mark a corresponding feature map in the combined feature map, so as to obtain a marked combined feature map. The marked combined feature map corresponding to the cascade network in each layer is the feature map extracted by the cascade network in each layer.

Figure 7C:
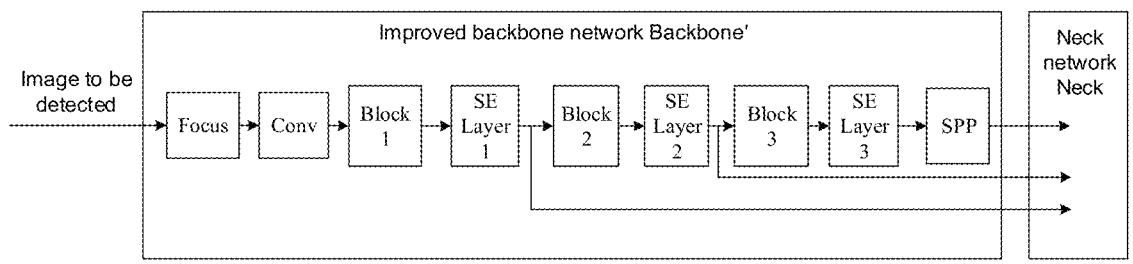
FIG. 7C is a diagram showing a structure of another feature extraction network, in accordance with some embodiments.

For example, the backbone network in the YOLOv5 network shown in FIG. 7A is improved to obtain another feature extraction network in the object detection network NN52. As shown in FIG. 7C, different from the backbone network in the YOLOv5 network, the cascade network in each layer in another feature extraction network may include a feature map extraction network Block and a network layer SE Layer generated by an SENet. A first-layer cascade network includes a feature map extraction network Block1 and a network layer SE Layer1. The first-layer cascade network includes a feature map extraction network Block2 and a network layer SE Layer2. The first-layer cascade network includes a feature map extraction network Block3 and a network layer SE Layer3.

It can be understood that, compared with a case in which the feature map is obtained by performing the convolution, the feature map extraction network in the object detection network generates the combined feature map through the convolution and the linear transformation, so that an amount of processed parameters is less. In addition, the weight learning network in the object detection network learns the weight of each channel feature in the combined feature map, and obtain an extracted feature map according to the weight of each channel feature in the combined feature map. In this way, the weight learning network may enhance effective feature information of the combined feature map and suppress interference information through the weight. Therefore, the object detection apparatus adopts the feature map extraction network in the object detection network, which reduce the amount of processed parameters, and improve the object detection efficiency. The weight learning network in the object detection network enhances the effective feature information of the combined feature map and suppresses the interference information to obtain the extracted feature map, and performs object detection on the extracted feature map, thereby improving object detection accuracy.

In some embodiments, the feature map extraction network includes at least one group of neural network modules. Each neural network module is used to perform a convolution, a linear transformation and a combination on an input content of the neural network module to generate a combined feature map corresponding to the neural network module. The object detection apparatus may obtain sample images and positions of objects in the sample images before S41 is performed, and then perform a size normalization processing on the sample images to obtain sample images to be detected. Then, the object detection apparatus trains an initial object detection network by using the sample images to be detected and the positions of the objects in the sample images so as to determine the number N of groups of neural network modules included in the feature map extraction network in the cascade network in each layer. The object detection apparatus generates the object detection network according to the determined number N of groups of neural network modules.

The position of the object in the sample image may be marked by the user through a marking operation.

The object detection network includes the feature extraction network, and the cascade network in each layer in the feature extraction network includes a feature map extraction network. The number N of groups of neural network modules included in feature map extraction networks in different cascade networks may be different or the same.

For example, the object detection network includes three-layer cascade networks, and the three-layer cascade networks include a first-layer cascade network, a second-layer cascade network and a third-layer cascade network. A feature map extraction network in the first-layer cascade network includes one group of neural network modules. A feature map extraction network in the second-layer cascade network includes six groups of neural network modules. A feature map extraction network in the third-layer cascade network includes seven groups of neural network modules. The number of neural network module(s) included in a group of neural network modules may be one, two or three. The number of neural network module(s) included in a group of neural network modules in different cascade networks may be different or the same.

For example, the object detection apparatus trains the object detection network including the feature extraction network shown in FIG. 7C, and determines that the number N of groups of neural network modules included in the feature map extraction network in the cascade network in each layer in the feature extraction network is that: one group of neural network modules is included in the feature map extraction network Block1, nine groups of neural network modules are included in the feature map extraction network Block2, and nine groups of neural network modules are included in the feature map extraction network Block3. Any group of neural network modules in the feature map extraction network Block1, the feature map extraction network Block2 and the feature map extraction network Block3 includes two neural network modules.

It will be noted that, for a specific process of performing the size normalization processing on the sample image by the object detection apparatus, reference can be made to the detailed description of the size normalization processing performed by the object detection apparatus on any frame of original image in S42, and details will not be repeated here.

In some embodiments, in addition to the at least one group of neural network modules, the feature map extraction network may further include a network layer including a depthwise separable convolution (DW Cony) and at least one neural network module.

The depthwise separable convolution is to convert a standard convolution process into a depthwise convolution and a 1×1 pointwise convolution.

For example, output(s) of the at least one group of neural network modules in the feature map extraction network are connected to an input of the network layer. The network layer may include a first neural network module, the depthwise separable convolution, a second neural network module, and a summation operation. The input of the network layer is an input of the first neural network module, an output of the first neural network module is connected to an input of the depthwise separable convolution, and an output of the depthwise separable convolution is connected to an input of the second neural network module, an output of the second neural network module and the input of the network layer are connected to an input of the summation operation, and an output of the summation operation is an output of the network layer.

Figure 8A:
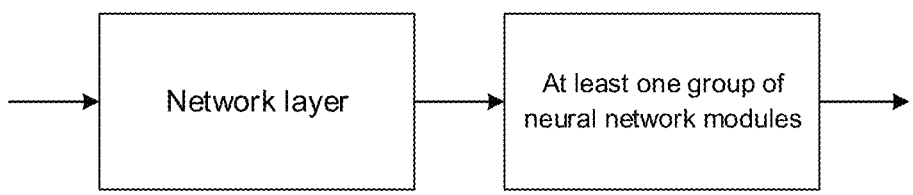
FIG. 8A is a diagram showing a structure of a feature image extraction network in a layer of cascade network, in accordance with some embodiments.

For example, as shown in FIG. 8A, the feature extraction network in the object detection network NN52 includes the multi-layer cascade networks, and a feature map extraction network Block in a cascade network in any layer may include at least one group of neural network modules (e.g., N groups of neural network modules with a stride equal to 1), and a network layer (e.g., in which a stride is equal to 2) composed of a DW Cony and at least one neural network module.

Figure 8B:
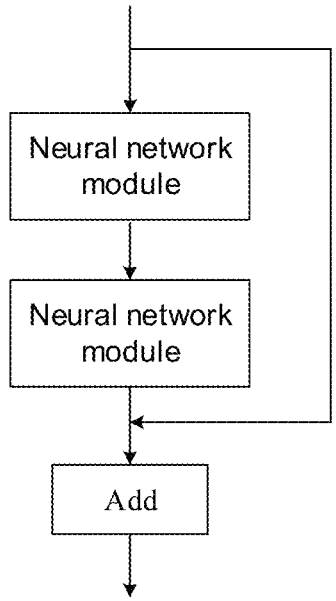
FIG. 8B is a diagram showing a structure of a group of neural network modules in a feature image extraction network, in accordance with some embodiments.

As shown in FIG. 8B, any group of neural network modules (e.g., in which a stride is equal to 1) may include two neural network modules and a summation operation Add.

Figure 8C:
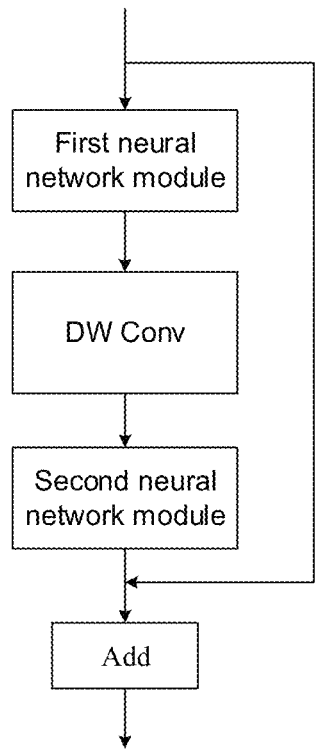
FIG. 8C is a diagram showing a structure of a network layer in a layer of cascade network, in accordance with some embodiments.

As shown in FIG. 8C, the network layer (e.g., in which the stride is equal to 2) composed of the DW Cony and the at least one neural network module may include: a first neural network module, a DW Cony in which a stride is equal to 2 (i.e., DW Cony Stride=2), a second neural network module, and a summation operation Add.

Figure 8D:
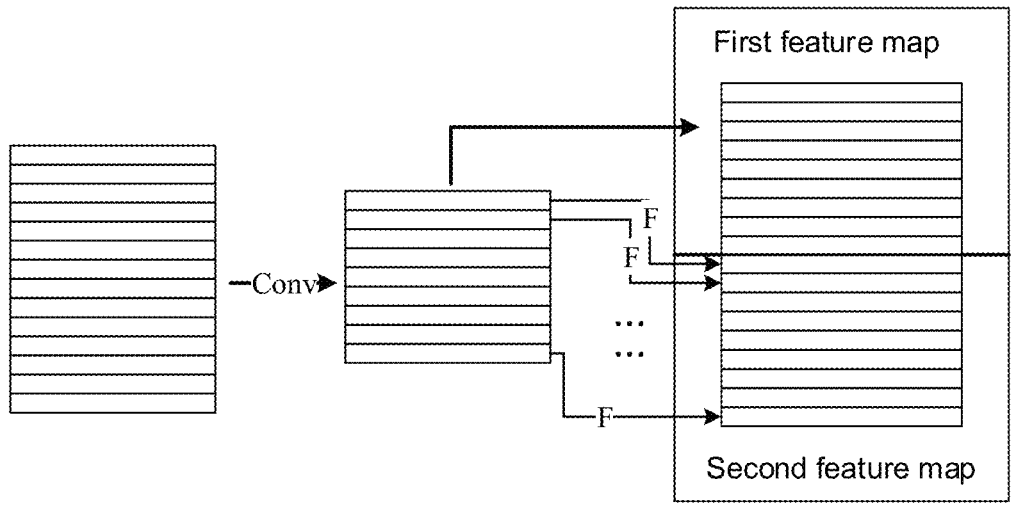
FIG. 8D is a diagram showing a structure of a neural network module, in accordance with some embodiments.

As shown in FIG. 8D, considering an example in which an input content of any neural network module is a feature map, the neural network module performs a convolution Cony on the input feature map to obtain a first feature map. Then, the neural network module performs a linear transformation F on the first feature map to obtain a second feature map. Finally, the first feature map and the second feature map constitute a combined feature map output by the neural network module.

For example, as shown in Table 1 below, the object detection apparatus inputs some images to be detected to the YOLOv5 network for object detection to obtain positions of objects in the images to be detected and confidence degrees corresponding to the positions. In this case, it may be measured that an amount of parameters in a process of performing the object detection by the YOLOv5 network on the images to be detected is 7.25 M.

In the same scenario, the object detection apparatus inputs the images to be detected to a first object detection network for object detection to obtain the positions of the objects in the images to be detected and the confidence degrees corresponding to the positions. The first object detection network includes the feature map extraction network Block shown in FIGS. 8A to 8D. In this case, it may be measured that an amount of parameters in a process of performing the object detection by the first object detection network on the images to be detected is 3.97 M.

In the same scenario, the object detection apparatus inputs the images to be detected into a second object detection network for object detection to obtain the positions of the objects in the images to be detected and the confidence degrees corresponding to the positions. The second object detection network includes the feature map extraction network Block and the network layer SE Layer shown in FIGS. 8A to 8D. In this case, it may be measured that an amount of parameters in a process of performing the object detection by the second object detection network on the images to be detected is 4.47 M.

TABLE 1

| Object detection network | Amount of parameters |
|---|---|
| YOLOv5 network | 7.25M |
| Object detection network including feature map extraction network Block and excluding network layer SE Layer | 3.97M |
| Object detection network including feature map extraction network Block and network layer SE layer | 4.47M |

It can be seen that, in the process of performing the object detection on the image to be detected, the first object detection network that includes the feature map extraction network and does not include the network layer SE Layer processes fewer parameters than the second object detection network that includes the feature map extraction network and the network layer SE Layer. In addition, compared with the YOLOv5 network that uses the convolution to extract the feature map, these two object detection networks that use the convolution and the linear transformation to extract the feature map process fewer parameters in the process of performing the object detection on the image to be detected. That is to say, compared with a case in which the feature map is obtained through the convolution, the feature map extraction network in the object detection network extracts the feature map through the convolution and the linear transformation, so that an amount of processed parameters is less. The object detection network also adopts the network layer SE Layer to improve the object detection accuracy. Although the network layer SE Layer increases some parameters, the amount of parameters is still less than an amount of parameters processed in the case in which the feature map is obtained through the convolution.

In some embodiments, the object detection apparatus may adopt a concurrency (e.g., multi-thread concurrency or multi-process concurrency) manner to execute S41 to S44. That is, S41 to S44 are performed simultaneously, thereby reducing time for object detection and achieving high throughput.

For example, the image to be detected includes the plurality of frames of images, and the plurality of frames of images include an i-th frame of image, a j-th frame of image, a g-th frame of image, and an h-th frame of image. Here, i, j, g, and h are all positive integers, i is greater than j, j is greater than g, and g is greater than h. While the object detection apparatus preprocesses the video to be detected to obtain the i-th frame of image, the object detection network extracts a feature map from the j-th frame of image, performs an object prediction on the extracted feature map, and performs a coordinate transformation on a target position in positions of objects in the g-th frame of image, and marks an object in an original image corresponding to the h-th frame of image in the video to be detected.

When the object detection apparatus preprocesses the video to be detected to obtain the i-th frame of image, the j-th frame of image, the g-th frame of image, and the h-th frame of image have been preprocessed.

Here, i, j, g and h may not be consecutive positive integers. For example, in a case where the object detection network adopts a batch processing manner to process the plurality of frames of images in the image to be detected, while the video to be detected is preprocessed to obtain the i-th frame of image, the object detection network extracts feature maps from the j-th frame of image to a (j+M)-th frame of image, and performs an object prediction on the extracted feature maps. The j-th frame of image to the (j+M)-th frame of image are all obtained by preprocessing. M is a positive integer; i is greater than j and (j+M), and j and (j+M) are greater than g; and M is the number of frames processed by the object detection network using the batch processing manner.

For example, for the object detection apparatus 50 shown in FIG. 5, the object detection apparatus 50 includes the pre-processing module Pre51, the object detection network NN52, the post-processing module Post53 and the display processing module Disp54. The pre-processing module Pre51, the object detection network NN52, the post-processing module Post53 and the display processing module Disp54 work concurrently (i.e., work simultaneously). The pre-processing module Pre51 performs S42 to obtain a frame of image, and outputs the frame of image to the object detection network NN52. The object detection network NN52 performs S43 in a batch processing manner to obtain a plurality of frames of images, and then outputs the plurality of frames of images to the post-processing module Post53. The post-processing module Post53 obtains a transformed position corresponding to a frame of image, and outputs the transformed position corresponding to the frame of image to the display processing module Disp54. According to the transformed position corresponding to the received frame of image, the display processing module Disp54 marks an object in an original image corresponding to the frame of image in the video to be detected. Furthermore, the display processing module Disp54 generates a marked object video after receiving transformed positions corresponding to all the images in the image to be detected and marking objects in original images corresponding to all the images in the video to be detected.

For example, the object detection apparatus performs an object detection on one video stream, a working time of the pre-processing module Pre51 is 2 ms, working time of the object detection network NN52 is 4 ms, a working time of the post-processing module Post53 is 2 ms, and a working time of the display processing module Disp54 is 1 ms, and thus a total time of the object detection performed by the object detection apparatus on the video stream is 4 ms, not 9 ms. It can be seen that, the pre-processing module Pre51, the object detection network NN52, the post-processing module Post53 and the display processing module Disp54 work concurrently, compared with a case in which the pre-processing module Pre51, the object detection network NN52, the post-processing module Post53 and the display processing module Disp54 operate serially, the throughput of the object detection method is increased by 125%.

It can be understood that, since the pre-processing module Pre51, the object detection network NN52, the post-processing module Post53 and the display processing module Disp54 in the object detection apparatus work simultaneously, a total time of the marked object video corresponding to the video stream obtained by the object detection apparatus performing the object detection on the video stream is the maximum working time in the working time of the pre-processing module Pre51, the working time of the object detection network NN52, the working time of the post-processing module Post53, and the working time of the display processing module Disp54, but is not a sum of the working time of the pre-processing module Pre51, the working time of the object detection network NN52, the working time of the post-processing module Post53 and the working time of the display processing module Disp54. The maximum working time in all the working time is less than the sum of all the working time. Therefore, the pre-processing module Pre51, the object detection network NN52, the post-processing module Post53 and the display processing module Disp54 in the object detection apparatus work simultaneously, which reduces a total time of the object detection, and in turn improves the throughput of the object detection.

In addition, since the working time of the object detection network is longer than working time of other steps in the object detection method, the working time of the object detection network determines the total time of the object detection. Furthermore, the object detection network may simultaneously process the plurality of frames of images in the image to be detected in the batch processing manner, which may reduce the working time of the object detection network compared with the case where one frame image in the image to be detected is processed each time, i.e., reduce the total time of the object detection.

In some embodiments, the video to be detected includes the multi-channel video streams. In addition to performing S41 to S44 in the concurrency manner on each video stream in the video to be detected, the object detection apparatus may further divide the multi-channel video streams in the video to be detected into a plurality of groups, and perform S41 to S44 in the concurrency manner on the plurality of groups of video streams at the same time.

Figure 9:
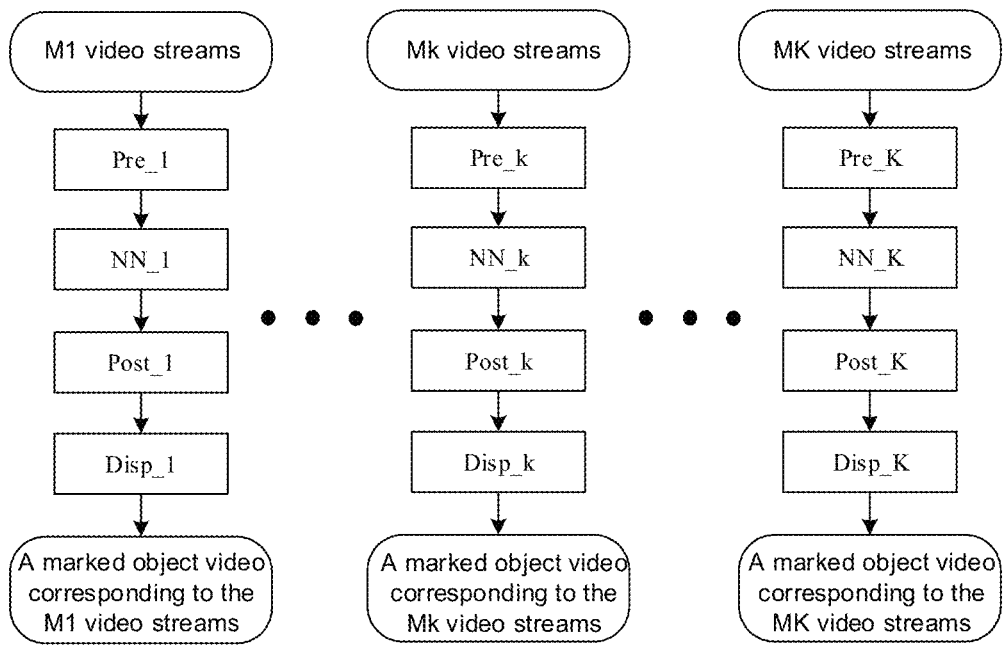
FIG. 9 is a diagram showing a structure of another object detection apparatus, in accordance with some embodiments.

For example, as shown in FIG. 9, the object detection apparatus may include K concurrent groups. The K concurrent groups are independent and concurrent, and the K concurrent groups perform S41 to S44 in the concurrency manner on the plurality of groups of video streams. Here, K is a positive integer. Each concurrent group includes a pre-processing module (e.g., Pre_1, Pre_k, or Pre_K), an object detection network (e.g., NN_1, NN_k, or NN_K), a post-processing module (e.g., Post_1, Post_k, or Post_K) and a display processing module (e.g., Disp_1, Disp_k, or Disp_K). The object detection apparatus inputs M1 video streams to a first concurrent group, . . . , inputs Mk video streams to a k-th concurrent group, . . . , and inputs MK video streams to the K-th concurrent group. A total number of video streams included in the video to be detected is equal to a sum of M1, . . . , Mk, . . . , and MK (M1++Mk++MK); M1, . . . , Mk, . . . , MK may be the same or different; and M1, . . . , Mk, . . . , MK are positive integers. For example, in a case where K is equal to four (i.e., K=4), and M1, M2, M3, and M4 are all equal to three (i.e., M1=M2=M3=M4=3), the total number of video streams is equal to twelve.

Furthermore, the first concurrent group performs an object detection on the M1 video streams, and outputs a marked object video corresponding to the M1 video streams. The k-th concurrent group performs an object detection on the Mk video streams, and outputs a marked object video corresponding to the Mk video streams. The K-th concurrent group performs an object detection on the MK video streams, and outputs a marked object video corresponding to the MK video streams.

It can be understood that, since the plurality of concurrent groups are completely independent, the object detection apparatus may simultaneously perform an object detection on the plurality of video streams through the plurality of concurrent groups, which may improve a speed of object detection, and improve the throughput of the object detection. In addition, in a case where hardware resources are sufficient, the more expanded concurrent groups, the greater the throughput processed by the object detection apparatus. For example, in a case where K is equal to four (i.e., K=4), and M1, M2, M3, and M4 are equal to four (i.e., M1=M2=M3=M4=4), if K is expanded to six, the throughput of the object detection apparatus is increased by 50%.

Figure 10:
FIG. 10 is a diagram showing a display interface for displaying marked object videos, in accordance with some embodiments.

For example, as shown in FIG. 10, if the video to be detected includes sixteen video streams, the object detection apparatus performs an object detection on each video stream, and marks a detection frame of an object in each frame of image in the video stream, so as to generate a marked object video corresponding to the video stream. Therefore, the object detection apparatus may obtain sixteen marked object videos corresponding to the sixteen video streams, and then display the sixteen marked object videos through the display module.

The foregoing mainly introduces the solutions provided in the embodiments of the present disclosure from perspective of method. In order to achieve the above functions, the embodiments of the present disclosure may provide corresponding hardware structures and/or software modules for performing various functions. A person skilled in the art may easily realize that the present disclosure may be implemented through hardware or a combination of hardware and computer software in conjunction with the modules and algorithm steps of the examples described in the embodiments disclosed herein. Whether a function is performed through hardware or computer software-driven hardware depends on the specific application and design constraints of the solutions. A skilled person may use different methods for each specific application to implement the described functions, but such implementation should not be considered beyond the scope of the present disclosure.

Figure 11:
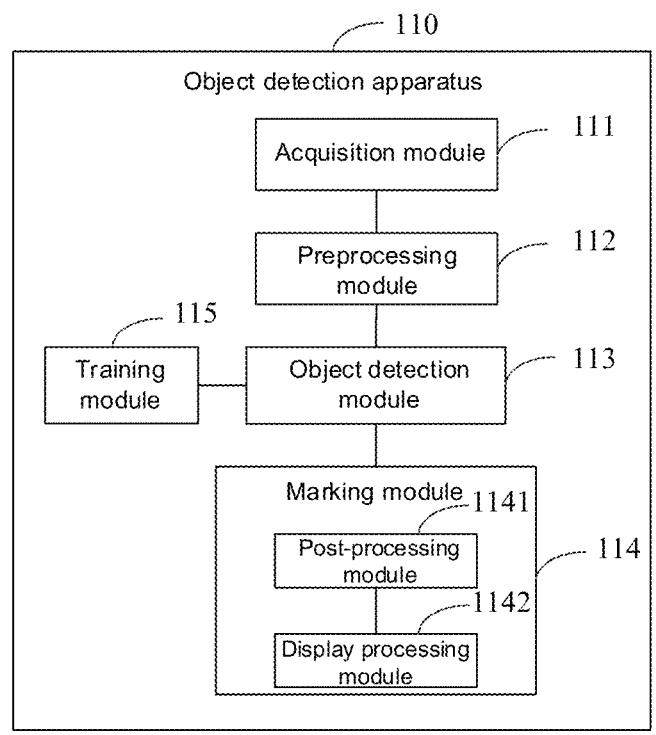
FIG. 11 is a diagram showing a structure of yet another object detection apparatus, in accordance with some embodiments.

Some embodiments of the present disclosure further provide an object detection apparatus. FIG. 11 is a diagram showing a structure of the object detection apparatus provided in the embodiments of the present disclosure. The object detection apparatus 110 is used to perform the object detection method. The object detection apparatus 110 may include an acquisition module 111, a preprocessing module 112, an object detection module 113 and a marking module 114.

The acquisition module 111 is used to obtain the video to be detected. The preprocessing module 112 is used to preprocess the video to be detected to obtain the image to be detected. The object detection module 113 is used to input the image to be detected into the object detection network. The object detection network extracts the feature map from the image to be detected, performs the object prediction on the extracted feature map, and obtains the position of the object in the image to be detected and the confidence degree corresponding to the position. The marking module 114 is used to generate the marked object video according to the position of the object in the image to be detected, the confidence degree corresponding to the position, and the video to be detected.

The object detection network includes multi-layer cascade networks, a feature map extracted by a cascade network in each layer is obtained according to a first feature map and a second feature map, the first feature map is obtained by performing a convolution on a feature map extracted by a previous-layer cascade network, and the second feature map is obtained by performing a linear transformation on the first feature map.

In some embodiments, the object detection network includes a feature extraction network, a feature fusion network and a prediction network. The feature extraction network includes the multi-layer cascade networks. The object detection module 113 is used to: input the image to be detected into the feature extraction network, so that the cascade network in each layer performs a convolution on the feature map extracted by the previous-layer cascade network to obtain the first feature map, performs a linear transformation on the first feature map to obtain the second feature map, and obtains the feature map extracted by the cascade network in each layer according to the first feature map and the second feature map; input a plurality of feature maps extracted by the multi-layer cascade networks into the feature fusion network to fuse the feature maps, so as to obtain fused feature maps; and input the fused feature maps into the prediction network for object prediction, so as to obtain position(s) of object(s) in the image to be detected and confidence degree(s) corresponding to the position(s).

In some embodiments, the cascade network in each layer includes a feature map extraction network and a weight learning network. The object detection module 113 is used to: through the feature map extraction network, perform a convolution on the feature map extracted by the previous-layer cascade network to obtain the first feature map, perform a linear transformation on the first feature map to obtain the second feature map, and combine the first feature map and the second feature map to generate a combined feature map; and learn weight of each channel feature in the combined feature map through the weight learning network to obtain the feature map extracted by the cascade network in each level.

In some embodiments, the feature map extraction network includes at least one group of neural network modules. Each neural network module is used to perform a convolution, a linear transformation and a combination on an input content of the neural network module to generate a combined feature map corresponding to the neural network module. The object detection apparatus 110 further includes a training module 115. The training module 115 is used to: obtain sample images and positions of objects in the sample images; preprocess the sample images to obtain sample images to be detected; train an initial object detection network by using the sample images to be detected and the positions of the objects in the sample images, so as to determine the number of groups of neural network modules included in the feature map extraction network in the cascade network in each layer; and generate the object detection network according to the determined number of groups of neural network modules.

In some embodiments, the feature extraction network includes three-layer cascade networks, and the three-layer cascade networks include a first-layer cascade network, a second-layer cascade network, and a third-layer cascade network. A feature map extraction network in the first-layer cascade network includes one group of neural network modules, a feature map extraction network in the second-layer cascade network includes nine groups of neural network modules, and a feature map extraction network in the third-layer cascade network includes nine groups of neural network modules.

In some embodiments, the feature map extraction network further includes a network layer including a depthwise separable convolution and at least one neural network module.

In some embodiments, output(s) of the at least one group of neural network modules in the feature map extraction network are connected to an input of the network layer. The network layer includes a first neural network module, the depthwise separable convolution, a second neural network module, and a summation operation. The input of the network layer is an input of the first neural network module, an output of the first neural network module is connected to an input of the depthwise separable convolution, an output of the depthwise separable convolution is connected to an input of the second neural network module, an output of the second neural network module and the input of the network layer are connected to an input of the summation operation, and an output of the summation operation is an output of the network layer.

In some embodiments, the marking module 114 includes a post-processing module 1141 and a display processing module 1142. The post-processing module 1141 is used to perform a coordinate transformation on a target position in positions of objects in an image to be detected according to confidence degrees corresponding to the positions and an image size corresponding to the video to be detected, so as to obtain a transformed position corresponding to the image to be detected. The display processing module 1142 is used to mark an object in an original image corresponding to the image to be detected in the video to be detected according to the transformed position corresponding to the image to be detected, so as to generate the marked object video.

A confidence degree corresponding to the target position is greater than confidence degrees corresponding to other positions, and the other positions are positions other than the target position in the positions of the objects in the image to be detected. The transformed position corresponding to the image to be detected represents a position of a detection frame of an object in an image to be detected in an original image corresponding to the image to be detected in the video to be detected.

In some embodiments, the image to be detected includes an i-th frame of image, a j-th frame of image, a g-th frame of image, and an h-th frame of image. Here, i, j, g, and h are all positive integers, i is greater than j, j is greater than g, and g is greater than h. While the object detection apparatus preprocesses the video to be detected to obtain the i-th frame of image, the object detection network extracts a feature map from the j-th frame of image, performs an object prediction on the extracted feature map, performs a coordinate transformation on a target position in positions of objects in the g-th frame of image, and marks an object in an original image corresponding to the h-th frame of image in the video to be detected.

Of course, the object detection apparatus 110 provided in the embodiments of the present disclosure includes but is not limited to the above modules.

Figure 12:
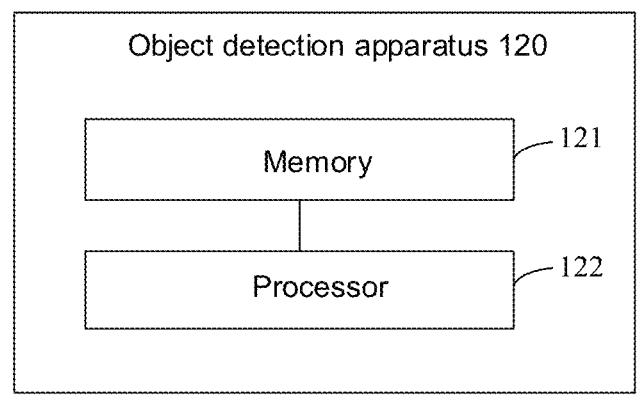
FIG. 12 is a diagram showing a structure of yet another object detection apparatus, in accordance with some embodiments.

Some embodiments of the present disclosure further provide an object detection apparatus. As shown in FIG. 12, the object detection apparatus 120 includes a memory 121 and a processor 122. The memory 121 is coupled to the processor 122. The memory 121 is used to store computer program codes, and the computer program codes include computer instructions. When executed by the processor 122, the computer instructions cause the object detection apparatus 120 to perform the steps in the object detection method described in the above embodiments.

In actual implementation, the processor 122 shown in FIG. 12 may call computer program codes in the memory 121 to realize functions of the acquisition module 111, the preprocessing module 112, the object detection module 113, the marking module 114 and the training module 115. For the specific implementation process, reference may be made to the description of the object detection method shown in FIG. 4, which will not be repeated here.

Some embodiments of the present disclosure further provide an object detection system. The object detection system includes the object detection apparatus described in the above embodiments, and multimedia acquisition device(s). The object detection apparatus is connected to the multimedia acquisition device(s). The multimedia acquisition device(s) are used to acquire the video to be detected. For example, referring to FIG. 1, the at least one multimedia acquisition device(s) 11 in the object detection system 10 are used to acquire at least one video stream, so as to acquire the video to be detected including one or more video streams.

In some embodiments of the present disclosure, a computer-readable storage medium (e.g., a non-transitory computer-readable storage medium) is provided. The computer-readable storage medium has stored computer programs. When the computer programs run on a processor, the processor executes one or more steps in the object detection method described in any of the above embodiments.

For example, the computer-readable storage medium may include, but is not limited to, a magnetic storage device (for example, a hard disk, a floppy disk or a magnetic tape), an optical disk (e.g., a compact disk (CD)), a digital versatile disk (DVD), a smart card, a flash memory device (e.g., an erasable programmable read-only memory (EPROM), a card, a stick or a key driver). Various computer-readable storage media described in the present disclosure may refer to one or more devices for storing information and/or other machine-readable storage medium. The term "machine-readable storage media" may include, but is not limited to, wireless channels and various other media capable of storing, containing and/or carrying instructions and/or data.

Some embodiments of the present disclosure further provide a computer program product. The computer program product includes computer programs, when executed on the object detection apparatus, the computer programs cause the object detection apparatus to perform one or more steps in the object detection method as described in the above embodiments.

Beneficial effects of the object detection system, the computer-readable storage medium, and the computer program product are the same as the beneficial effects of the object detection method as described in the embodiments, which will not be repeated here.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An object detection method, comprising:
obtaining a video to be detected;
preprocessing the video to be detected to obtain an image to be detected;
inputting the image to be detected into an object detection network;
extracting, by the object detection network, a feature map from the image to be detected;
performing, by the object detection network, an object prediction on the extracted feature map, so as to obtain a position of an object in the image to be detected and a confidence degree corresponding to the position, wherein the object detection network includes multi-layer cascade networks, a feature map extracted by a cascade network in each layer is obtained according to a first feature map and a second feature map, the first feature map is obtained by performing a convolution on a feature map extracted by a previous-layer cascade network, and the second feature map is obtained by performing a linear transformation on the first feature map; and generating a marked object video according to the position of the object in the image to be detected, the confidence degree corresponding to the position, and the video to be detected;

wherein the object detection network includes a feature extraction network, a feature fusion network and a prediction network; the feature extraction network includes the multi-layer cascade networks; and inputting the image to be detected into the object detection network, extracting, by the object detection network, the feature map from the image to be detected, and performing, by the object detection network, the object prediction on the extracted feature map, so as to obtain the position of the object in the image to be detected and the confidence degree corresponding to the position, includes:

inputting the image to be detected into the feature extraction network;

performing, by the cascade network in each layer, the convolution on the feature map extracted by the previous-layer cascade network to obtain the first feature map;

performing, by the cascade network in each layer, the linear transformation on the first feature map to obtain the second feature map;

obtaining, by the cascade network in each layer, the feature map extracted by the cascade network in each layer according to the first feature map and the second feature map;

inputting a plurality of feature maps extracted by the multi-layer cascade networks into the feature fusion network to fuse the feature maps, so as to obtain fused feature maps; and inputting the fused feature maps into the prediction network for object prediction, so as to obtain the position of the object in the image to be detected and the confidence degree corresponding to the position.

2. The method according to claim 1, wherein the cascade network in each layer includes a feature map extraction network and a weight learning network; and performing, by the cascade network in each layer, the convolution on the feature map extracted by the previous-layer cascade network to obtain the first feature map, performing, by the cascade network in each layer, the linear transformation on the first feature map to obtain the second feature map, and obtaining, by the cascade network in each layer, the feature map extracted by the cascade network in each layer according to the first feature map and the second feature map, includes:

performing, by the feature map extraction network, a convolution on the feature map extracted by the previous-layer cascade network to obtain the first feature map;

performing, by the feature map extraction network, a linear transformation on the first feature map to obtain the second feature map;

combining, by the feature map extraction network, the first feature map and the second feature map to generate a combined feature map; and learning, by the weight learning network, weight of each channel feature in the combined feature map to obtain the feature map extracted by the cascade network in each layer.

3. The method according to claim 2, wherein the feature map extraction network includes at least one group of neural network modules; each neural network module is used to perform a convolution, a linear transformation and a combination on an input content of the neural network module, so as to generate a combined feature map corresponding to the neural network module; and the method further comprises:

obtaining sample images and positions of objects in the sample images;

preprocessing the sample images to obtain sample images to be detected;

training an initial object detection network by using the sample images to be detected and the positions of the objects in the sample images, so as to determine a number of groups of neural network modules included in the feature map extraction network in the cascade network in each layer; and generating the object detection network according to the determined number of groups of neural network modules.

4. The method according to claim 3, wherein the feature extraction network includes three-layer cascade networks, the three-layer cascade networks including a first-layer cascade network, a second-layer cascade network, and a third-layer cascade network; and a feature map extraction network in the first-layer cascade network includes one group of neural network modules, a feature map extraction network in the second-layer cascade network includes nine groups of neural network modules, and a feature map extraction network in the third-layer cascade network includes nine groups of neural network modules.

5. The method according to claim 3, wherein the feature map extraction network further includes a network layer including a depthwise separable convolution and at least one neural network module.

6. The method according to claim 5, wherein at least one output of the at least one group of neural network modules in the feature map extraction network is connected to an input of the network layer;

the network layer includes a first neural network module, the depthwise separable convolution, a second neural network module, and a summation operation; and the input of the network layer is an input of the first neural network module, an output of the first neural network module is connected to an input of the depthwise separable convolution, an output of the depthwise separable convolution is connected to an input of the second neural network module, an output of the second neural network module and the input of the network layer are connected to an input of the summation operation, and an output of the summation operation is an output of the network layer.

7. The method according to claim 1, wherein the object detection network obtains positions of objects in the image to be detected and confidence degrees corresponding to the positions; and generating the marked object video according to the position of the object in the image to be detected, the confidence degree corresponding to the position, and the video to be detected, includes:

performing a coordinate transformation on a target position in the positions of the objects in the image to be detected according to the confidence degrees corresponding to the positions and an image size corresponding to the video to be detected, so as to obtain a transformed position corresponding to the image to be detected; and marking an object in an original image corresponding to the image to be detected in the video to be detected according to the transformed position corresponding to the image to be detected, so as to generate the marked object video; wherein a confidence degree corresponding to the target position is greater than confidence degrees corresponding to other positions, and the other positions are positions other than the target position in the positions of the objects in the image to be detected; and the transformed position corresponding to the image to be detected represents a position of a detection frame of the object in the image to be detected in the original image corresponding to the image to be detected in the video to be detected.

8. The method according to claim 7, wherein the image to be detected includes an i-th frame of image, a j-th frame of image, a g-th frame of image, and an h-th frame of image; i, j, g, and h are positive integers, i is greater than j, j is greater than g, and g is greater than h; and while preprocessing the video to be detected to obtain the i-th frame of image, the object detection network extracts a feature map from the j-th frame of image, performs an object prediction on the extracted feature map, and performs a coordinate transformation on a target position in positions of objects in the g-th frame of image, and marks an object in an original image corresponding to the h-th frame of image in the video to be detected.

9. An object detection apparatus comprising a memory and a processor; wherein the memory is coupled to the processor; the memory is used to store computer program codes, and the computer program codes includes computer instructions; and the computer instructions, when executed by the processor, cause the apparatus to perform the object detection method according to claim 1.

10. An object detection system comprising the object detection apparatus according to claim 9, and at least one camera, wherein the object detection apparatus is connected to the at least one camera, and the at least one camera is used to acquire the video to be detected.

11. A non-transitory computer-readable storage medium storing computer programs that, when run on an object detection apparatus, cause the object detection apparatus to perform the object detection method according to claim 1.

12. The method according to claim 4, wherein the feature map extraction network further includes a network layer including a depthwise separable convolution and at least one neural network module.

13. The method according to claim 12, wherein at least one output of the at least one group of neural network modules in the feature map extraction network is connected to an input of the network layer;

the network layer includes a first neural network module, the depthwise separable convolution, a second neural network module, and a summation operation; and the input of the network layer is an input of the first neural network module, an output of the first neural network module is connected to an input of the depthwise separable convolution, an output of the depthwise separable convolution is connected to an input of the second neural network module, an output of the second neural network module and the input of the network layer are connected to an input of the summation operation, and an output of the summation operation is an output of the network layer.

14. The method according to claim 1, wherein the video to be detected includes video streams; and preprocessing the video to be detected to obtain the image to be detected, includes:

preprocessing each video stream in the video to be detected to obtain a plurality of frames of images, so as to obtain the image to be detected, wherein the plurality of frames of images constitute an image to be detected corresponding to the video stream, and the image to be detected corresponding to the video to be detected includes the plurality of frames of images in the image to be detected corresponding to the video stream.

15. The method according to claim 14, wherein extracting, by the object detection network, the feature map from the image to be detected, and performing, by the object detection network, the object prediction on the extracted feature map to obtain the position of the object in the image to be detected and the confidence degree corresponding to the position, includes:

extracting, by the object detection network, feature maps from the plurality of frames of images in the image to be detected corresponding to the video stream; and performing, by the object detection network, the object prediction on the extracted feature maps to obtain positions of objects in the plurality of frames of images in the image to be detected corresponding to the video stream and confidence degrees corresponding to the positions.

16. The method according to claim 15, wherein generating the marked object video according to the position of the object in the image to be detected, the confidence degree corresponding to the position, and the video to be detected, includes:

generating a marked object video corresponding to the video stream according to the positions of the objects in the plurality of frames of images in the image to be detected corresponding to the video stream, the confidence degrees corresponding to the positions, and the video stream, so as to obtain marked object videos corresponding to the video streams in the video to be detected.

17. An object detection method, comprising:

obtaining a video to be detected;

preprocessing the video to be detected to obtain an image to be detected;

inputting the image to be detected into an object detection network;

extracting, by the object detection network, a feature map from the image to be detected;

performing, by the object detection network, an object prediction on the extracted feature map, so as to obtain a position of an object in the image to be detected and a confidence degree corresponding to the position, wherein the object detection network includes multi-layer cascade networks, a feature map extracted by a cascade network in each layer is obtained according to a first feature map and a second feature map, the first feature map is obtained by performing a convolution on a feature map extracted by a previous-layer cascade network, and the second feature map is obtained by performing a linear transformation on the first feature map; and generating a marked object video according to the position of the object in the image to be detected, the confidence degree corresponding to the position, and the video to be detected;

wherein the object detection network obtains positions of objects in the image to be detected and confidence degrees corresponding to the positions; and generating the marked object video according to the position of the object in the image to be detected, the confidence degree corresponding to the position, and the video to be detected, includes:

performing a coordinate transformation on a target position in the positions of the objects in the image to be detected according to the confidence degrees corresponding to the positions and an image size corresponding to the video to be detected, so as to obtain a transformed position corresponding to the image to be detected; and marking an object in an original image corresponding to the image to be detected in the video to be detected according to the transformed position corresponding to the image to be detected, so as to generate the marked object video; wherein a confidence degree corresponding to the target position is greater than confidence degrees corresponding to other positions, and the other positions are positions other than the target position in the positions of the objects in the image to be detected; and the transformed position corresponding to the image to be detected represents a position of a detection frame of the object in the image to be detected in the original image corresponding to the image to be detected in the video to be detected;

the image to be detected includes an i-th frame of image, a j-th frame of image, a g-th frame of image, and an h-th frame of image; i, j, g, and h are positive integers, i is greater than j, j is greater than g, and g is greater than h; and while preprocessing the video to be detected to obtain the i-th frame of image, the object detection network extracts a feature map from the j-th frame of image, performs an object prediction on the extracted feature map, and performs a coordinate transformation on a target position in positions of objects in the g-th frame of image, and marks an object in an original image corresponding to the h-th frame of image in the video to be detected.

* * * * *